United States Patent Office 3,285,751
Patented Nov. 15, 1966

3,285,751
ARTIFICIAL SWEETENER COMPOSITION
Paul Kracauer, New York, N.Y., assignor to Cumberland Packing Company, Brooklyn, N.Y., a New York company
No Drawing. Filed Apr. 27, 1964, Ser. No. 362,974
4 Claims. (Cl. 99—141)

The present invention relates to new artificial sweetener compositions, and more particularly to artificial sweetener compositions which have no calories or are substantially free of calories, and which can be used for the sweetening of any food without leaving any bitter after-taste which is common for most known artificial sweetening compositions.

The use of artificial sweetners such as the saccharines and the cyclamates (which are sold under the trade name of Sucaryl) have become extremely popular in recent years, these artificial sweeteners being used by persons who wish to reduce their caloric intake, either for medical reasons or simply for reasons of diet.

Although both the saccharines and the cyclamates give a very high degree of sweetness with substantially no caloric value, both of these groups of substances suffer from the distadvantage of leaving a bitter after-taste in the mouth of the user. In some cases this bitter after-taste actually makes the user nauseous, and many people avoid the use of these artificial sweeteners for this reason.

This primary disadvantage of the artificial sweeteners has been extremely difficult to overcome, attempts having been made to overcome the bitter after-taste, for example, by mixing the sweeteners. However, no solution as yet devised has been entirely successful.

It is accordingly a primary object of the present invention to provide an artificial sweetener composition which is substantially free of calories which does not have any of the bitter after-taste of the known sweetening compositions.

It is yet another object of the present invention to provide artificial sweetener compositions which have practically no caloric value and which gives a close approximation to the natural sweetening of cane sugar or the like without leaving any bitter after-taste.

Another disadvantage of the known artificial sweetening compositions is actually a result of the primary usefulness of the artificial sweeteners, namely the fact that the artificial sweeteners are hundreds of times sweeter than sugar so that extremely small amounts, which are too small to provide any substantial caloric intake, are needed to provide the desired sweetening effect. Due to that fact that extremely small amounts of the artificial sweeteners are used, it has been necessary to try to devise means of combining these sweeteners with bulking agents which have no adverse effect on the taste or on the dissolution of the artificial sweetener. The results of such attempts are, for example, the well known effervescent saccharine tablets, solutions of the sweeteners, for example mixtures of saccharine and a cyclamate, etc.

However, these compositions suffer from numerous disadvantages. Thus, for example, the effervescent tablets take some time to dissolve, and the agents used for this purpose themselves may give the food a bad taste. Furthermore, obviously these tablets cannot be used for the sweetening of solid foods, for example grapefruit, nor can these tablets be used suitably for baking, etc.

The solutions of the sweeteners are difficult to measure, so that accurate sweetening cannot be obtained, and also these sweeteners cannot easily and uniformly be distributed on solid foods.

One recent attempt to solve this problem has been to combine the artificial sweetener with natural sweetener; e.g., a mixture of saccharine and sugar. However, in this case the bulking agent itself provides considerable calories so that the resulting composition is far from being calorie-free.

It is therefore a further object of the present invention to provide artificial sweetener compositions which have sufficient bulk so that the same can be easily measured for accurate sweetening, or can be distributed in unit dose sweetening packets, and which are, nevertheless, substantially calorie-free.

It is yet another object of the present invention to provide such artificial sweetener compositions having bulk which do not adversely affect the taste of the food in which the same are distributed, and which can be easily distributed in any type of food, for example drinks, on grapefruit, used in baking, etc.

Other objects and advantages of the present invention will be apparent from a further reading of the specification and of the appended claims.

With the above and other objects in view, the present invention mainly comprises as a sweetening composition an artificial sweetener, sodium citrate or potassium citrate and glucono delta lactone. It has been found that when these three ingredients are used in combination, and particularly so in the proportions hereinafter set forth, the resulting composition, although it is substantially free of calories, has sufficient bulk to be easily handled, and particularly to be packed in individual unit dose packets, and can be used for the sweetening of any food to a degree closely approximating the taste of natural sugar without leaving any bitter after-taste.

The term "artifical sweetener" as used throughout the specification and claims of this case, is meant to refer to any of the commonly available artifical sweeteners, such as saccharine itself and the salts thereof, e.g. sodium saccharine, as well as the cyclamates such as sodium cyclamate and calcium cyclamate (i.e., Sucaryl and its salts).

It is most preferred, according to the present invention, to use a mixture of a cyclamate such as calcium cyclamate and a saccharine such as sodium saccharine as the artificial sweetener, although either the saccharine or the cyclamate can be used alone. It is thus clear that the term "artificial sweetener" as used herein is meant to include mixtures of artificial sweeteners as well as the individual artificial sweeteners.

It is preferred, according to the present invention, to use per amount of artificial sweetener having the sweetening power of approximately 10 grams of sugar between about 0.3 gram and 1 gram of glucono delta lactone and between about 0.3 gram and 1 gram of sodium citrate or potassium citrate.

It should be noted that it is essential, according to the present invention, to use both the glucono delta lactone and the sodium citrate or potassium citrate in combination in accordance with the present invention. I have found that if glucono delta lactone is used alone as the filler, while it will not alter the original taste of the artificial sweetener with which it is mixed, it will eventually cause milk to curdle. Consequently, such a composition cannot be used for the sweetening of coffee, for example, for baking with milk, or for the sweetening of milk products.

On the other hand, if sodium citrate or potassium citrate is used alone as the filler with the artificial sweetener, it cannot be used for the sweetening of drinks containing tannic acid and/or caffein, such as coffee, tea, mocha, etc., because of a chemical reaction which results in discoloration (darkening) of the coffee, tea or the like.

I have found that when glucono delta lactone is mixed with the sodium citrate and/or potassium citrate the resulting composition can be used for the sweetening of milk or milk products without any danger of curdling, and it also can be used for the sweetening of coffee, tea or any other drink containing tannic acid and/or caffein, without causing any discoloration.

The composition of the present invention can be simply formed by blending the artificial sweetener or sweeteners with the glucono delta lactone and the sodium citrate and/or potassium citrate in the desired proportions. A preferred method of manufacture comprises the mixing of the components of the composition with an aqueous-alcohol mixture and then carefully drying at low temperature, in accordance with a normal granulation method, to thereby form an extremely uniform composition which dissolves very quickly and consists of uniform granules of optimum size.

The following examples are given to further illustrate the present invention. The scope of the invention is not, however, meant to be limited to the specific details of the examples.

*Example 1*

0.38 g. of glucono delta lactone, 0.35 g. of sodium citrate, 0.15 g. of calcium cyclamate, and 0.01 g. of soluble saccharine (sodium saccharine) are thoroughly and uniformly mixed together.

This composition, totaling in weight to approximately 1 gram, has the sweetening power of 10 grams of sugar.

*Example 2*

A uniform mixture is made of 300 grams of glucono delta lactone, 1000 grams of sodium citrate, and 10 grams of calcium saccharine. Each 1.3 grams of this mixture has the approximate sweetening power of 10 grams of sugar.

*Example 3*

A uniform mixture is made of 1000 grams of glucono delta lactone, 350 grams of sodium citrate, and 150 grams of calcium cyclamate. Each 1.5 grams of this mixture has the approximate sweetening power of 10 grams of sugar.

*Example 4*

550 grams of glucono delta lactone, 550 grams of sodium citrate, 150 grams of calcium cyclamate, and 10 grams of sodium saccharine are granulated in normal manner with a water-alcohol mixture, and after low temperature drying uniform granules of the composition are obtained. Each approximately 1.25 g. of these granules have the sweetening power of 10 grams of sugar and can be quickly dissolved in any liquid food.

Without further analysis, the foregoing will so fully reveal the gist of the present invention that others can by applying current knowledge readily adapt it for various applications without omitting features that, from the stand-point of prior art, fairly constitute essential characteristics of the generic or specific aspects of this invention and, therefore, such adaptations should and are intended to be comprehended within the meaning and range of equivalents of the following claims.

What is claimed as new and desired to be secured by Letters Patent is:

1. A sweetening composition, comprising at least one artificial sweetener selected from the group consisting of saccharine artificial sweeteners and cyclamate artificial sweeteners, the sweetening power of said artificial sweetener being a known predetermined multiple of the sweetening power of sugar, between about 0.3 g. and 1 g. of glucono delta lactone per each amount of said artificial sweetener equivalent in sweetening power to 10 grams of sugar, and between about 0.3 g. and 1 g. of at least one compound selected from the group consisting of sodium citrate and potassium citrate per each amount of said artificial sweetener equivalent in sweetening power to 10 grams of sugar.

2. A sweetening composition, comprising a saccharine artificial sweetener, the sweetening power of said artificial sweetener being a known predetermined multiple of the sweetening power of sugar, between about 0.3 g. and 1 g. of glucono delta lactone per each amount of said artificial sweetener equivalent in sweetening power to 10 grams of sugar, and between about 0.3 g. and 1 g. of at least one compound selected from the group consisting of sodium citrate and potassium citrate per each amount of said artificial sweetener equivalent in sweetening power to 10 grams of sugar.

3. A sweetening composition, comprising a cyclamate artificial sweetener, the sweetening power of said artificial sweetener being a known predetermined multiple of the sweetening power of sugar, between about 0.3 g. and 1 g. of glucono delta lactone per each amount of said artificial sweetener equivalent in sweetening power to 10 grams of sugar, and between about 0.3 g. and 1 g. of at least one compound selected from the group consisting of sodium citrate and potassium citrate per each amount of said artificial sweetener equivalent in sweetening power to 10 grams of sugar.

4. A sweetening composition, comprising an artificial sweetener consisting essentially of a mixture of a saccharine artificial sweetener and a cyclamate artificial sweetener, the sweetening power of said artificial sweetener being a known predetermined multiple of the sweetening power of sugar, between about 0.3 g. and 1 g. of glucono delta lactone per each amount of said artificial sweetener equivalent in sweetening power to 10 grams of sugar, and between about 0.3 g. and 1 g. of at least one compound selected from the group consisting of sodium citrate and potassium citrate per each amount of said artificial sweetener equivalent in sweetening power to 10 grams of sugar.

References Cited by the Examiner

UNITED STATES PATENTS

| | | | |
|---|---|---|---|
| 2,803,551 | 8/1957 | Helgren | 99—141 |
| 2,968,566 | 1/1961 | Munch | 99—141 X |
| 3,105,792 | 10/1963 | White | 99—141 |

A. LOUIS MONACELL, *Primary Examiner.*

RAYMOND N. JONES, S. E. HEYMAN,
*Assistant Examiners.*